US010182240B2

(12) United States Patent
Hsu (10) Patent No.: US 10,182,240 B2
(45) Date of Patent: Jan. 15, 2019

(54) METHOD OF BI-PREDICTION VIDEO CODING BASED ON MOTION VECTORS FROM UNI-PREDICTION AND MERGE CANDIDATE (71) Applicant: MEDIATEK INC., Hsin-Chu (TW)

(72) Inventor: Chih-Wei Hsu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 56 days.

(21) Appl. No.: 15/526,068

(22) PCT Filed: Nov. 4, 2015

(86) PCT No.: PCT/CN2015/093764
§ 371 (c)(1),
(2) Date: May 11, 2017

(87) PCT Pub. No.: WO2016/078511
PCT Pub. Date: May 26, 2016

(65) Prior Publication Data
US 2017/0310990 A1  Oct. 26, 2017

Related U.S. Application Data (60) Provisional application No. 62/081,128, filed on Nov. 18, 2014.

(51) Int. Cl.
*H04N 19/577* (2014.01)
*H04N 19/44* (2014.01)
(Continued)

(52) U.S. Cl.
CPC .......... *H04N 19/577* (2014.11); *H04N 19/44* (2014.11); *H04N 19/513* (2014.11); *H04N 19/52* (2014.11)

(58) Field of Classification Search
CPC ..... H04N 19/577; H04N 19/513; H04N 19/44
See application file for complete search history.

(56) References Cited

U.S. PATENT DOCUMENTS 8,953,689 B2 * 2/2015 Sugio ................... H04N 19/513
375/240.16
9,288,501 B2  3/2016 Zheng et al.
(Continued)

FOREIGN PATENT DOCUMENTS

CN  CA 102843555 A  12/2012
CN  CA 103430540 A  12/2013
(Continued)

OTHER PUBLICATIONS

International Search Report dated Jan. 29, 2016, issued in application No. PCT/CN2015/093764.
Bross, B., et al.; "High-Efficiency Video Coding (HEVC) text specification draft 8;" Joint Collaborative Team on Video coding (JCT-VC) of ITU-T SG16 WP3 and ISO/IEC JTC1/SC29/WG11; Jul. 2012; pp. 1-303.
Seregin, V., et al.; "Non-SCE3 Bandwidth reduction for combined inter mode;" Joint Collaborative Team on Video coding (JCT-VC) of ITU-T SG 16 WP 3 and ISO/IEC JTC 1/SC 29/WG 11; Apr. 2013; pp. 1-5.
(Continued)

*Primary Examiner* — Tsion B Owens
(74) *Attorney, Agent, or Firm* — McClure, Qualey & Rodack, LLP (57) ABSTRACT A method of bi-predictive Inter prediction mode using a uni-predictive motion vector and a second motion vector associated with a Merge candidate is disclosed. In the encoder side, the coded motion information for a uni-prediction motion vector for the current block is generated using a motion vector predictor selected from a motion vector prediction (MVP) candidate list. Furthermore, a
(Continued)

| Merge_idx | L0 | L1 |
|---|---|---|
| 0 | mvL0_A,ref0 | - |
| 1 | - | mvL1_B,ref1 |
| 2 | | |
| 3 | | |
| 4 | | |

⟱ 310

| Merge_idx | L0 | L1 |
|---|---|---|
| 0 | mvL0_A,ref0 | - |
| 1 | - | mvL1_B,ref1 |
| 2 | mvL0_A,ref0 | mvL0'_B,ref0' |
| 3 | mvL1'_A,ref1' | mvL1_B,ref1 |
| 4 | | |

320

Merge candidate with a second motion vector pointing to the other prediction direction is identified according to a Merge index. The uni-prediction motion vector and the second motion vector from the Merge candidate are used for bi-prediction encoding of the current block. In the decoder side, the corresponding decoding process is disclosed.

20 Claims, 6 Drawing Sheets

(51) Int. Cl.
*H04N 19/52* (2014.01)
*H04N 19/513* (2014.01)

(56) References Cited

U.S. PATENT DOCUMENTS

| | | | | |
|---|---|---|---|---|
| 9,838,695 | B2* | 12/2017 | Sugio | H04N 19/197 |
| 2013/0107958 | A1 | 5/2013 | Shimada et al. | |
| 2013/0195188 | A1 | 8/2013 | Sugio et al. | |
| 2015/0085930 | A1* | 3/2015 | Zhang | H04N 19/136 |
| | | | | 375/240.15 |
| 2015/0312588 | A1* | 10/2015 | Yamamoto | H04N 19/105 |
| | | | | 375/240.15 |
| 2015/0358644 | A1 | 12/2015 | Sugimoto et al. | |
| 2016/0080774 | A1* | 3/2016 | Zhang | H04N 19/30 |
| | | | | 375/240.15 |
| 2017/0127041 | A1* | 5/2017 | Bang | H04N 19/597 |

FOREIGN PATENT DOCUMENTS

| | | |
|---|---|---|
| WO | WO 2012/128903 A1 | 9/2012 |
| WO | WO 2014/104104 A1 | 7/2014 |

OTHER PUBLICATIONS

Fukushima, S., et aL; "Merge based mvd transmission;" Joint Collaborative Team on Video Coding (JCT-VC) OF ITU-T SG16 WP3 AND ISO/IEC JTC1/SC29MG11; Jul. 2011; pp. 1-8.

Chen, J., et al.; "MVP index parsing with fixed number of candidates;" Joint Collaborative Team on Video Coding (JCT-VC) of ITU-T SG16 WP3 and ISO/IEC JTC1/SC29/WG11; Jul. 2011; pp. 1-14.

Zheng, Y., et al.; "CE09 Crosscheck report of JCTVC-G052 test MRG_MVD03;" Joint Collaborative Team on Video Coding (JCT-VC) of ITU-T SG16 WP3 and ISO/IEC JTC1/SC29/WG11; Nov. 2011; pp. 1-4.

Fukushima, S., et al.; "CE9 Results of MRG_MVD series;" Joint Collaborative Team on Video Coding (JCT-VC) of ITU-T SG16 WP3 and ISO/IEC JTC1/SC29/WG11; Nov. 2011; pp. 1-14.

* cited by examiner

METHOD OF BI-PREDICTION VIDEO CODING BASED ON MOTION VECTORS FROM UNI-PREDICTION AND MERGE CANDIDATE

CROSS REFERENCE TO RELATED APPLICATIONS

The present invention claims priority to U.S. Provisional Patent Application, No. 62/081,128, filed on Nov. 18, 2014. The U.S. Provisional Patent Application is hereby incorporated by reference in its entirety.

TECHNICAL FIELD

The present invention relates to video coding. In particular, the present invention relates to combining the uni-prediction mode and Merge mode in the other prediction direction to form a new type of bi-prediction.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block. A CU may begin with a largest CU (LCU), which is also referred as coded tree unit (CTU) in HEVC and each CU can be recursively split into four smaller CUs until the pre-defined minimum size is reached. Once the splitting of CU hierarchical tree is done, each CU is further split into one or more prediction units (PUs) according to prediction type and PU partition.

To achieve the best coding efficiency of hybrid coding architecture in HEVC, a prediction mode is adaptively determined for each PU to select either Intra prediction or Inter prediction. For Intra prediction modes, the spatial neighboring reconstructed pixels can be used to generate the directional predictions. There are up to 35 directions in HEVC. For Inter prediction modes, the temporal reconstructed reference frames can be used to generate motion compensated predictions. There are three different Inter modes, including Skip, Merge and Inter Advanced Motion Vector Prediction (AMVP) modes.

When a PU is coded in Inter AMVP mode, motion-compensated prediction is performed using transmitted motion vector differences (MVDs) that can be used together with Motion Vector Predictors (MVPs) to derive motion vectors (MVs). To decide MVP in Inter AMVP mode, the advanced motion vector prediction (AMVP) scheme is used to select a motion vector predictor among an AMVP candidate set including two spatial MVPs and one temporal MVP. In AMVP mode, MVP index for the MVP and the corresponding MVDs are required to be encoded and transmitted. In addition, the Inter prediction direction to specify the prediction directions among bi-prediction and uni-prediction (i.e., list 0 (L0) or list 1 (L1)) is encoded and transmitted. Furthermore, the reference frame index for each list is also encoded and transmitted.

When a PU is coded in either Skip or Merge mode, no motion information is transmitted except the Merge index of the selected candidate. In the Skip and Merge modes, the MVD is zero and there is no need to transmit MVD. Accordingly, the decoded MV is recovered using motion inference methods (i.e., MV=MVP) since the MVD is equal to zero. The MVP may correspond to a spatially neighboring blocks (spatial candidates) or a temporal block (temporal candidate) located in a co-located picture. According to HEVC, the co-located picture is the first reference picture in list 0 or list 1 as signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

Figure 1:
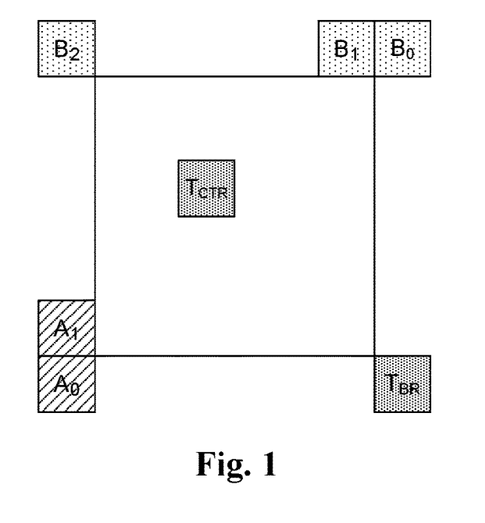
FIG. 1 illustrates neighboring block configuration for the Advanced Motion Vector Prediction (AMVP) mode and Merge modes according to High Efficient Video Coding.

FIG. 1 shows the neighboring PUs referred to derive the spatial and temporal MVPs for both AMVP and Merge scheme. In AMVP, the spatial MVPs include a left MVP and a top MVP. The left MVP is the first available one from neighboring blocks blocks $A_0$ and $A_1$, and the top MVP is the first available one from neighboring blocks block $B_0$, $B_1$ and $B_2$. On the other hand, the temporal MVP is the first available MV from co-located reference block $T_{BR}$ or $T_{CTR}$, where $T_{BR}$ is used first and if $T_{BR}$ is not available, $T_{CTR}$ is used instead. If the left MVP is not available and the top MVP is a non-scaled MVP, a second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. After removing redundancy, if the number of available MVPs is less than two, zero vector candidate(s) is added to the candidates list.

For Skip and Merge modes, up to four spatial Merge indices are derived from $A_0$, $A_1$, $B_0$ and $B_1$, and one temporal Merge index is derived from $T_{BR}$ or $T_{CTR}$ as shown in FIG. 1. Note that if any of the four spatial Merge indices is not available, the position $B_2$ is then used as a substitute position to derive Merge index. After the derivation process of the four spatial Merge indices and one temporal Merge index, removing redundancy is applied to remove any redundant Merge index. After removing redundancy, if the number of available Merge indices is smaller than five, three types of additional candidates can be derived and added to the candidates list.

Additional bi-predictive Merge candidates are derived based on original Merge candidates. The additional candidates are classified into three candidate types:

1. Combined bi-predictive Merge candidate (candidate type 1)
2. Scaled bi-predictive Merge candidate (candidate type 2)
3. Zero vector Merge/AMVP candidate (candidate type 3).

Figure 2A:
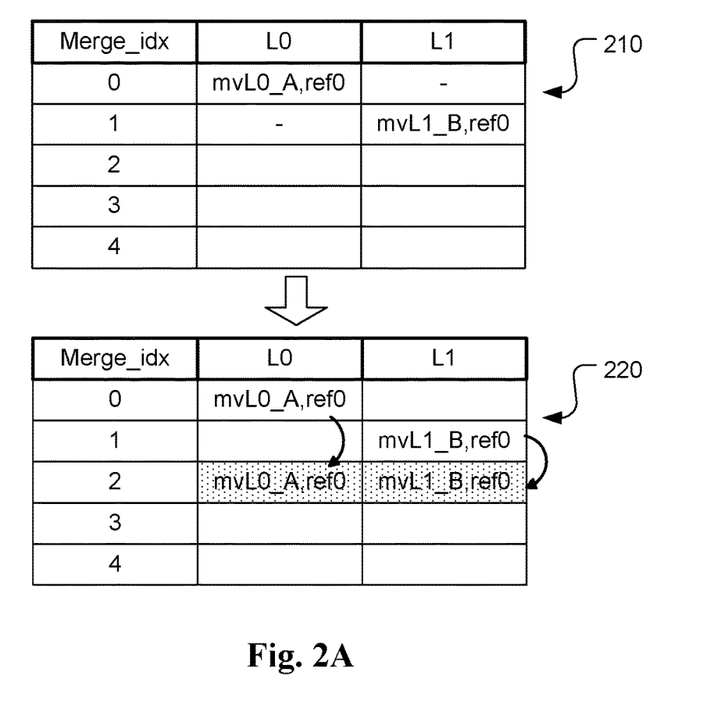
FIGS. 2A-B illustrate an example of generating a bi-prediction Merge candidate based on two uni-prediction motion vectors.
Figure 2B:
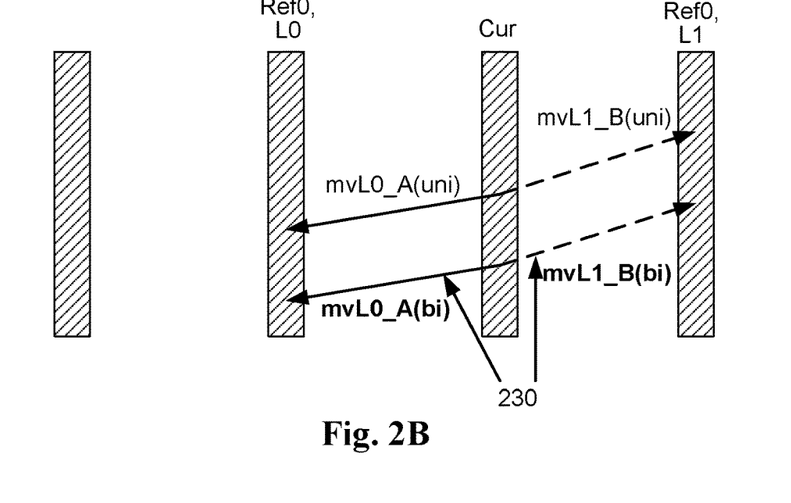

In candidate type 1, combined bi-predictive Merge candidates are created by combining original Merge candidate. In particular, two original candidates, which have mvL0 (i.e., the motion vector in list 0) with refIdxL0 (i.e., the reference picture index in list 0) and mvL1 (i.e., the motion vector in list 1) with refIdxL1 (i.e., the reference picture index in list 1) respectively, are used to created bi-predictive Merge candidates. An example of the derivation process of combined bi-predictive Merge candidate is shown in FIG. 2A and FIG. 2B, where mvL0_A and mvL1_B are two uni-predictive Merge candidates. FIG. 2A illustrates an original Merge candidate list (210) and the Merge candidate list after adding a combined candidate (220), where the added Merge candidates are highlighted by dotted background. Also, Merge index 0 is assigned to uni-predictive Merge candidate, mvL0_A, Merge index 1 is assigned to uni-predictive Merge candidate, mvL1_B and Merge index 2 is assigned to the added bi-predictive Merge candidate, (mvL0_A, mvL1_B). Candidate mvL0_A points to reference picture ref0 in reference list L0 and candidate mvL1_B points to reference picture ref0 in reference list L1 as shown in FIG. 2B. The two uni-predictive Merge candidates are combined into one bi-predictive Merge candidate (230) as shown in FIG. 2B.

Figure 3A:
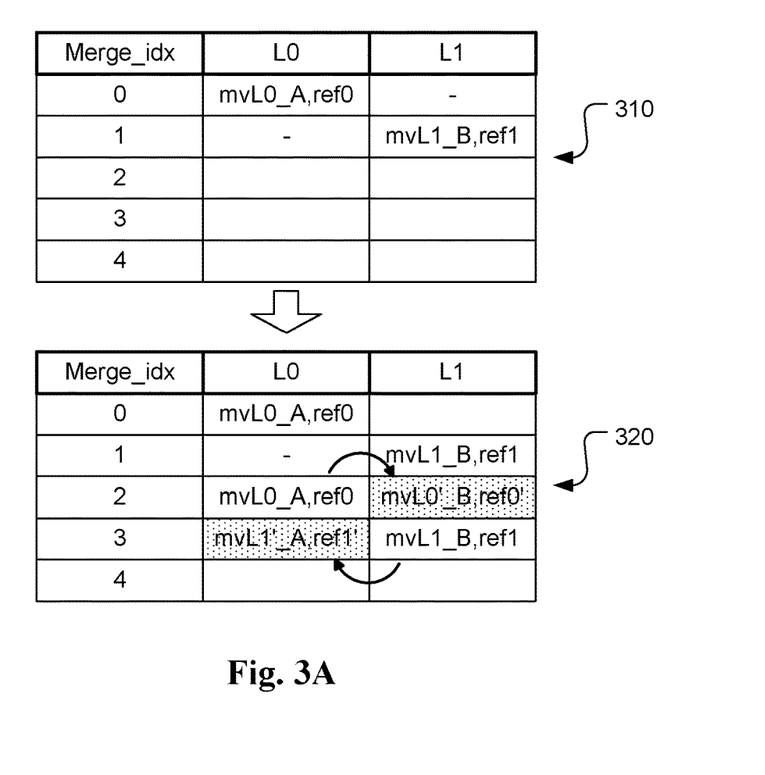
FIGS. 3A-B illustrate an example of generating bi-prediction Merge candidates based on uni-prediction motion vectors and scaled uni-prediction motion vectors.
Figure 3B:
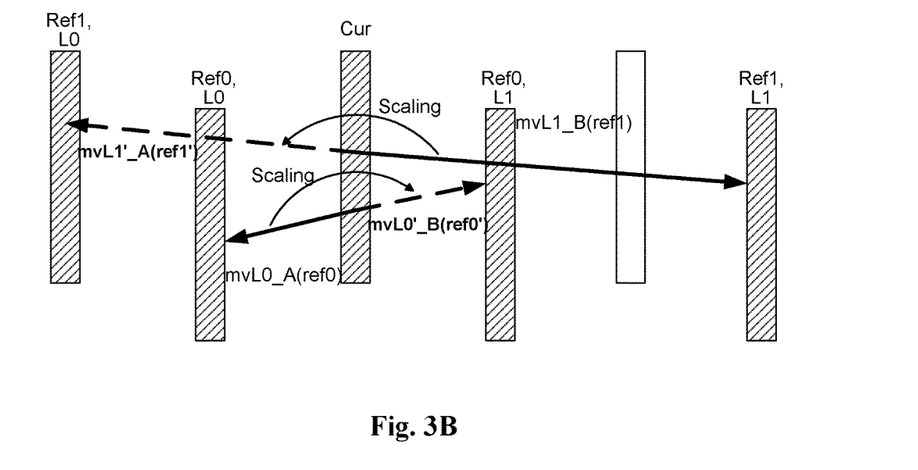

In candidate type 2, scaled bi-predictive Merge candidates are created by scaling original Merge candidate. In particular, the original candidate, which has motion vector, mvLX (i.e., the motion vector in list X) and associated reference picture refIdxLX (i.e., the reference picture index in list X), is used to generate bi-predictive Merge candidates, where X is equal to 0 or 1. For example, candidate A may have uni-predictive motion vector mvL0_A associated with reference picture ref0 in list 0. The reference index ref0 is firstly copied to reference index ref0' in list 1. A scaled motion vector mvL0'_B is calculated by scaling mvL0_A with respect to ref0 and ref0' according to distance of picture order count (POC). Bi-predictive Merge candidate is generated from mvL0_A with ref0 in list 0 and mvL0'_B with ref0' in list 1. The generated scaled bi-predictive Merge candidate is added into Merge candidate list. An example of the derivation process of scaled bi-predictive Merge candidate is shown in FIG. 3A and FIG. 3B, where mvL0_A and mvL1_B are two uni-predictive Merge candidates. FIG. 3A illustrates an original Merge candidate list (310) and the Merge candidate list after adding scaled candidates (320), where the added Merge candidates are highlighted by dotted background. Merge index 2 is assigned to scaled bi-predictive Merge candidate, ((mvL0_A, ref0), (mvL0'_B,ref0')). Merge index 3 is assigned to scaled bi-predictive Merge candidate, ((mvL1'_A, ref1'), (mvL1_B,ref1)). The two scaled bi-predictive Merge candidates are shown in FIG. 3B.

Figure 4A:
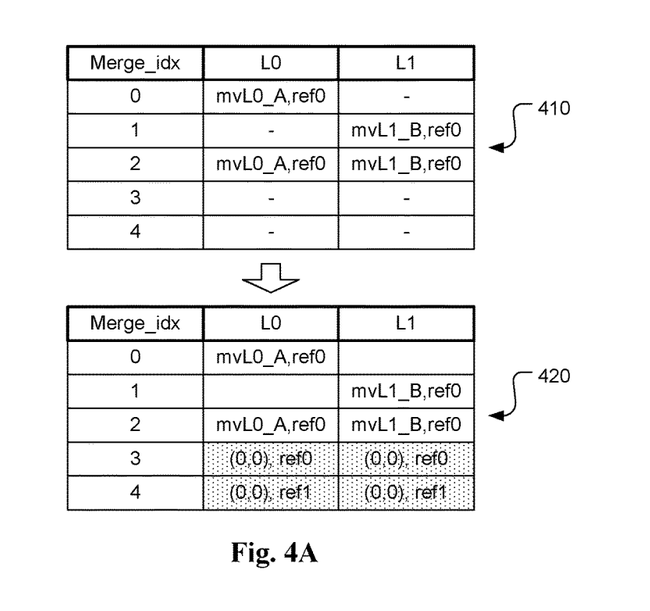
FIGS. 4A-B illustrate examples of adding zero-valued motion vector candidate(s) into Merge candidates list and advanced motion vector prediction (AMVP) candidate list respectively.
Figure 4B:
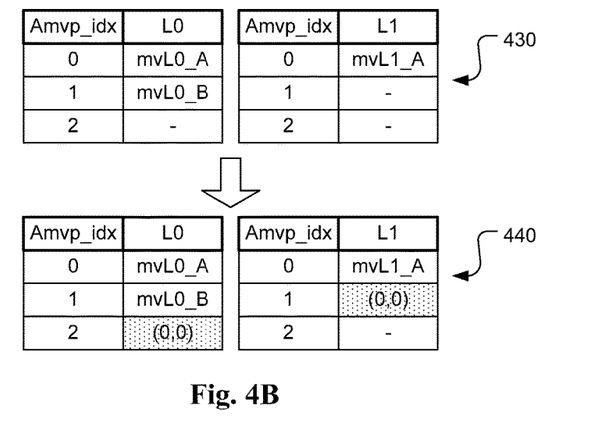

In candidate type 3, zero vector Merge/AMVP candidates are created by combining zero vectors and reference index that can be referred. FIG. 4A shows an example of adding zero-valued Merge candidates to the original Merge candidate list (410) to form a filled Merge candidate list (420). FIG. 4B shows an example of adding zero-valued AMVP candidates to original AMVP candidate lists (430) to form filled AMVP candidate lists (440). If zero-valued candidates are not duplicated, it is added to Merge/AMVP candidate set.

As mentioned above, bi-prediction can be derived from uni-prediction motion vector(s) by combining the uni-prediction motion vectors or scaling the uni-prediction motion vector(s). It is desirable to further improve the coding efficiency for the case of uni-prediction.

SUMMARY

A method of bi-predictive Inter prediction mode using a uni-predictive motion vector pointing in one prediction direction and a second motion vector associated with a Merge candidate pointing to the other prediction direction is disclosed. In the encoder side, when the encoder selects a uni-predictive prediction direction, the coded motion information for a corresponding motion vector for the current block is generated using a motion vector predictor selected from a motion vector prediction (MVP) candidate list. Furthermore, a Merge candidate with a second motion vector pointing to the other prediction direction is identified according to a Merge index. The uni-prediction motion vector and the second motion vector from the Merge candidate are used for bi-prediction encoding of the current block. In the decoder side, when the prediction direction is uni-prediction as indicated in a coded bitstream, coded motion information is determined from the coded bitstream for deriving the uni-prediction motion vector. The Merge candidate is determined based on the Merge index in the coded bitstream. The uni-prediction motion vector and the second motion vector from the Merge candidate are used for bi-prediction decoding of the current block.

The coded motion information with respect to the motion vector predictor includes a reference index pointing to the first reference picture, a MVP index pointing to the motion vector predictor in the MVP candidate set, and a motion vector difference (MVD) between the first motion vector and the motion vector predictor. If the uni-prediction corresponds to list L0, the second motion vector of the Merge candidate pointing to list L1. Similarly, if the uni-prediction corresponds to list L1, the second motion vector of the Merge candidate pointing to list L0.

The Merge candidate set can be derived according to a Merge candidate set generation process for Merge mode coding. The Merge candidate set may also be derived from an initial Merge candidate set by re-allocating a bi-prediction Merge candidate to two uni-prediction candidates, where the initial Merge candidate set is generated according to a Merge candidate set generation process for Merge mode coding. The Merge candidate set may also be generated by inserting into the Merge candidate set with different Merge candidates from initial Merge candidates for initial Merge candidate set. Furthermore, the Merge candidate set for the second reference list can be derived from another Merge candidate set for the first reference list.

Whether to apply the bi-prediction motion compensated decoding to the current block can be according to a flag explicitly signaled or implicitly inferred. Whether to apply the bi-prediction motion compensated decoding to the current block can also be according to a size of the current block, wherein the current block corresponds to a coding unit (CU) or a prediction unit (PU).

DETAILED DESCRIPTION

As mentioned before, among the two motion information coding modes (i.e., AMVP and Merge modes) used in the High Efficiency Video Coding (HEVC) standard, AMVP can provide high quality representation of the motion information at the expense of more bits. On the other hand, the Merge mode uses a compact representation that only needs to signal the candidate index to recover the motion information. For the Merge mode, the motion information including Inter prediction direction, reference picture list and motion vector, is restricted to be the same as that of a selected Merge candidate.

The present invention discloses a method for Inter prediction that converts a uni-prediction candidate into a bi-prediction candidate by using a Merge candidate in the other direction of the uni-prediction candidate. The method of forming a new bi-prediction candidate by combining a uni-prediction candidate and a Merge candidate according to the present invention is termed as Uni-Merge Bi-prediction (UMB) mode for Inter prediction. The details of the UMB mode are described as follow.

Figure 5:
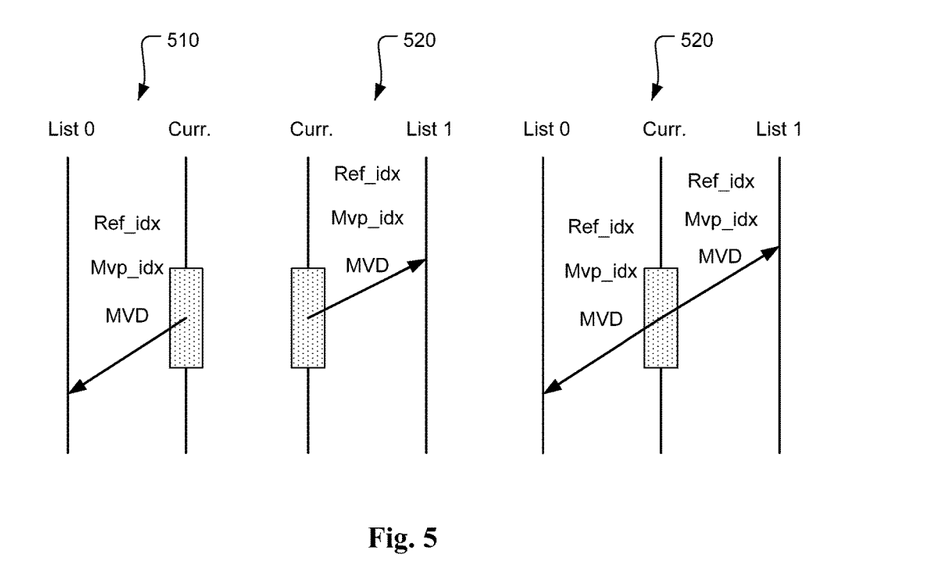
FIG. 5 illustrates signaled motion information associated with uni-prediction and bi-prediction.
Figure 6:
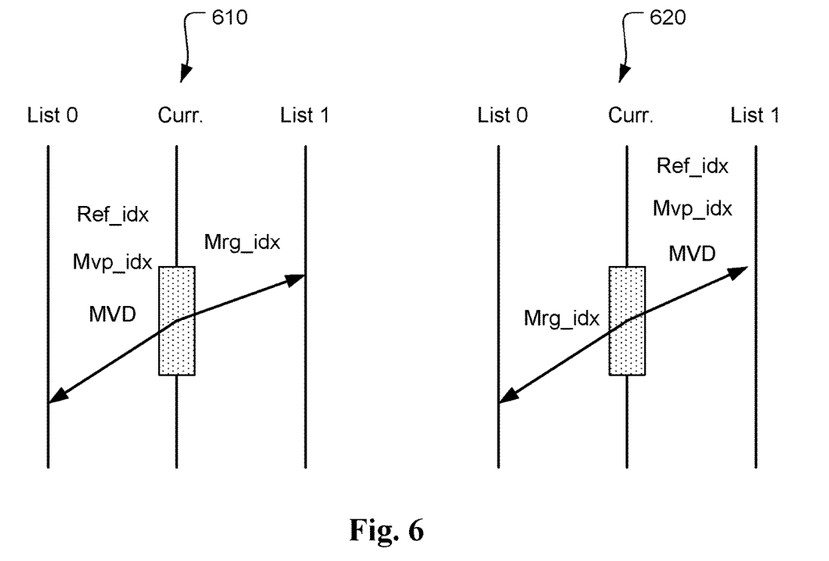
FIG. 6 illustrates examples of bi-prediction based on signaled motion information associated with uni-prediction and signaled Merge index according to an embodiment of the present invention.

When a PU is coded in Inter AMVP mode, the Inter prediction direction can be chosen among Bi-prediction, L0 or L1, where L0 and L1 are uni-prediction. According to the conventional HEVC standard, reference index (i.e., ref idx), MVP index and MVD are encoded and transmitted for each list 0 (510), list 1 (520) and bi-prediction (530), as shown in FIG. 5. When a PU is coded in Merge mode, only Merge index will be encoded and transmitted. However, according to the UMB mode, if the Inter prediction direction is L0, a Merge index will be used to specify the motion vector candidate for L1. If the Inter prediction direction is L1, a Merge index will be used to specify the motion vector candidate for L0. FIG. 6 illustrates an example of UMB mode according to an embodiment of the present invention for prediction direction being L0 (610) and L1 (620) respectively. UMB achieves bi-prediction by using prediction in one direction based on the AMVP scheme and prediction in the other direction based on the Merge scheme.

Accordingly, an encoder according to an embodiment of the present invention may use the UMB mode by signaling the coded motion information based on the AMVP scheme and signaling the Merge index to identify a second motion vector of the Merge candidate pointing to the other prediction direction. As mentioned before, the coded motion information includes the reference index pointing to a reference picture in the reference list for the uni-prediction direction, a MVP index pointing to the motion vector predictor in the AMVP candidate set, and a motion vector difference (MVD) between the current motion vector and the motion vector predictor. An exemplary syntax structure for an embodiment of the present invention is shown as follows:

---
Uni-Merge Bi-prediction (UMB)
inter_dir
If (inter_dir != Bi-prediction)
  ■ UMB_flag
  ■ if (UMB_flag == true)
    • merge_dix
If (Inter_dir != L1)
  ■ motion data L0
---

-continued

---
If (Inter_dir != L0)
  ■ motion data L1.
---

As shown above, syntax inter_dir indicating Inter prediction direction is incorporated. If inter_dir indicates uni-prediction (i.e., inter_dir!=Bi-prediction), a flag UMB_flag indicating whether UMB is used is incorporated in the bitstream. If UMB mode is used (i.e., UMB_flag==true), a Merge index merge_dix is incorporated in the bitstream. If the uni-prediction direction is L0 (i.e., Inter_dir!=L1), coded motion information for L0 (i.e., motion data L0) is incorporated in the bitstream. If the uni-prediction direction is L1 (i.e., Inter_dir!=L0), coded motion information for L1 (i.e., motion data L1) is incorporated in the bitstream. The coded motion information for L0 or L1 will be combined with a motion vector of the Merge candidate pointing to the other prediction to form bi-prediction. If the uni-prediction direction is L0, the motion vector of the Merge candidate pointing to L1 will be used for bi-prediction. On the other hand, if the uni-prediction direction is L1, the motion vector of the Merge candidate pointing to L0 will be used for bi-prediction. The exemplary syntax shown above is for illustration purpose and should not be construed as limitations of the present invention. A skilled person may use other variations of the syntax to practice the present invention.

Figure 7:
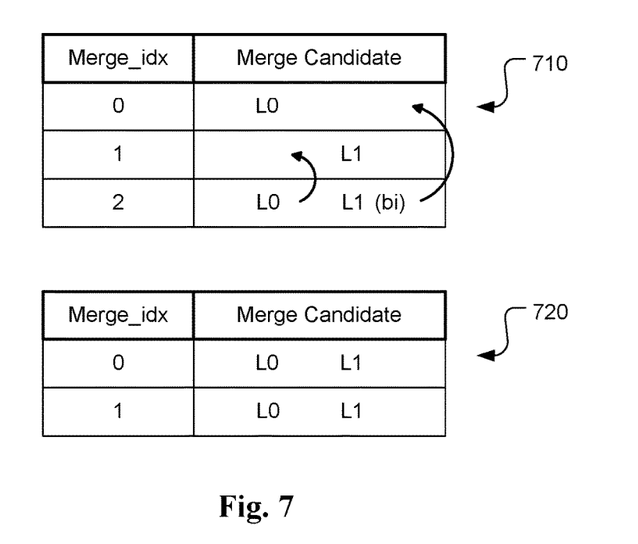
FIG. 7 illustrates an example of re-locating Merge candidates to reduce the total number of Merge candidates according to an embodiment of the present invention.

In original Merge scheme, the Merge index is used to derive one motion candidate from the Merge candidate set, where the candidates are derived based on spatial and temporal neighbors and can be either uni-prediction or bi-prediction. In the UMB mode, since the Merge index is only used to specify the motion candidate for one list, the Merge candidate set can still use the original set as derived according to the Merge scheme. However, a Merge candidate set different from the conventional Merge candidate set may also be used. For example, motion vector candidates different from the motion vector candidates for the conventional Merge candidate list can be inserted into a new Merge candidate set. In another embodiment, the Merge candidate set derived for a current list can be used for the other list. The corresponding required MV for the UMB mode is selected from the Merge candidate set based on the Merge index transmitted. FIG. 7 shows examples of UMB modes. For the Merge candidate list 710, there are four UMB mode possibilities corresponding to L0+mrg_idx 1, L0+mrg_idx 2, L1+mrg_idx 0, and L1+mrg_idx 2. According to UMB, only L1 candidate of the bi-prediction Merge candidate will be used for uni-prediction L0 as the motion vector in the other prediction direction. Similarly, only the L0 candidate of the bi-prediction Merge candidate will be used for uni-prediction L1 as the motion vector in the other prediction direction. There is redundancy in the conventional Merge list. The coding efficiency can be improved by rearranging the predetermined Merge candidate set compliant with the conventional Merge scheme. Therefore, a candidate re-locating process as re-locating a bi-prediction Merge candidate to two uni-prediction candidates is indicated by the arrows and the re-located Merge candidate set 720 is shown in FIG. 7. After re-location, the Merge candidate set becomes more compact and the four UMB modes become L0+mrg_idx 0, L0+mrg_idx 1, L1+mrg_idx 0, and L1+mrg_idx 1. In another embodiment, the candidate re-locating process can be done by re-locating a uni-prediction Merge candidate to an empty entry of the initial Merge candidate set with respect to the reference list associated with the uni-prediction Merge candidate. For example, the uni-prediction Merge candidate pointing to L1 and corresponding to mrg_idx 1 in the Merge candidate list 710 can be moved forward to correspond with mrg_idx 0 as the Merge candidate corresponding to mrg_idx 0 is uni-prediction and is pointing to L0. Then, the bi-prediction Merge candidate corresponding to mrg_idx 2 can be moved forward to correspond with mrg_idx 1.

With the UMB mode, the bi-prediction uses one transmitted MV in one direction and uses a selected MV from the Merge candidate set in the other direction. The amount of data access is about the same as a regular bi-prediction mode and, therefore the worst case memory bandwidth is unchanged for motion compensation as in the regular bi-prediction mode. In addition, the UMB mode is expected to result in better prediction than the Merge mode and less bit overhead than the AMVP bi-prediction mode. An embodiment based on the present invention has been tested on some test sequences under various coding configuration. For example, under the random access (RA) coding configuration, an embodiment of UMB using both L0 _mrg_idx and L1+mrg_idx modes has shown 0.6% improvement in term of RD-rate over the conventional Merge mode. The RD-rate is a well-known performance measurement for video coding. For low-delay B-picture (LD-B) coding configuration, the embodiment of the present invention has shown an improvement of 0.5% in BD-rate.

The UMB scheme as disclosed above can be turned on or turned off explicitly or implicitly. In the explicit approach, a flag can be signaled to indicate whether UMB is turned on or off. In the implicitly approach, the on/off decision can be derived based on statistics of neighboring blocks. In another embodiment, the UMB on off decision can be made based on the coding unit (CU) size or the prediction unit (PU) size.

Figure 8:
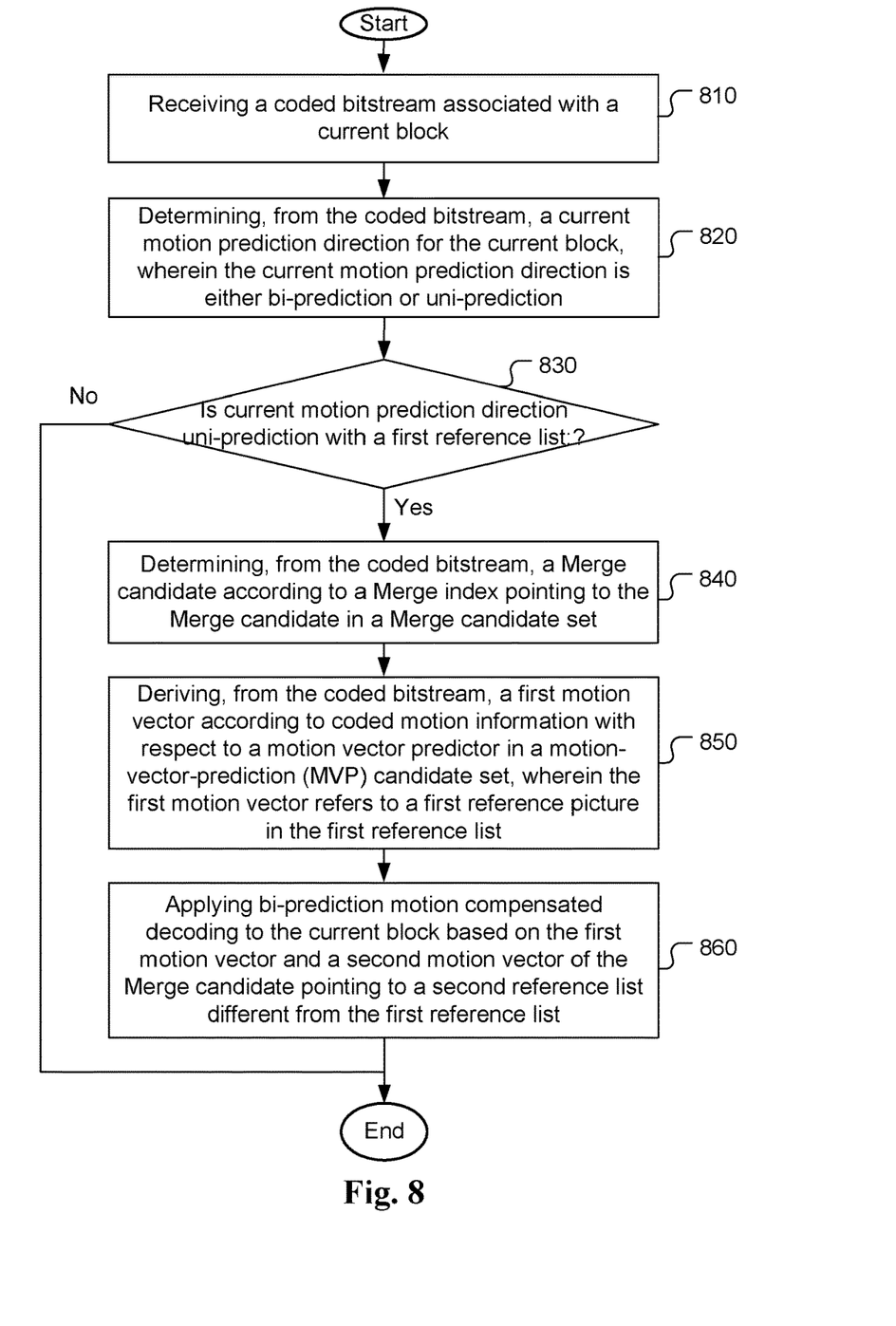
FIG. 8 illustrates an exemplary flowchart of a decoder incorporating bi-prediction based on a uni-prediction motion vector pointing to one direction and a second motion vector associated with a Merge candidate pointing to the other direction according to one embodiment of the present invention.

FIG. 8 illustrates an exemplary flowchart of a decoder incorporating bi-prediction based on a uni-prediction motion vector pointing to one direction and a second motion vector associated with a Merge candidate pointing to the other direction according to one embodiment of the present invention. The decoder receives a coded bitstream associated with a current block in step 810. The bitstream may be retrieved from memory (e.g., computer memory, buffer (RAM or DRAM) or other media) or from a processor. From the coded bitstream, a current motion prediction direction for the current block is determined in step 820, where the current motion prediction direction is either bi-prediction or uni-prediction. Whether the current motion prediction direction is uni-prediction corresponding to a first reference list is tested in step 830. If the prediction is bi-prediction (i.e., the "No" path), the follow steps are skipped. Otherwise (i.e., the "Yes" path), a Merge candidate according to a Merge index pointing to the Merge candidate in a Merge candidate set is determined from the coded bitstream in step 840. From the coded bitstream, a first motion vector is derived according to coded motion information with respect to a motion vector predictor in a motion-vector-prediction (MVP) candidate set in step 850, where the first motion vector refers to a first reference picture in the first reference list. Bi-prediction motion compensated decoding is then applied to the current block based on the first motion vector and a second motion vector of the Merge candidate pointing to a second reference list different from the first reference list as shown in step 860.

The flowchart shown above is intended to illustrate an example of bi-prediction coding according to embodiments of the present invention. A person skilled in the art may modify each step, re-arranges the steps, split a step, or combine steps to practice the present invention without departing from the spirit of the present invention.

As shown above, Merge mode motion refinement is used to illustrate an example of explicitly coding partial motion information from a neighboring block and inheriting the remaining motion information. However, the present invention is not restricted to Merge refinement mode, where the motion vector difference (MVD) is explicitly coded and the remaining motion information is inherited from the selected merge candidate. For example, instead of coding all motion information associated with an AMVP mode (i.e., Inter mode), partial motion information may be inherited from a neighboring block.

The UMB mode described in the foregoing embodiments achieves bi-prediction by using prediction in one direction based on the AMVP scheme and prediction in the other direction based on the Merge scheme. However, the present invention is not restricted to AMVP scheme and Merge scheme. According to another embodiment of the present invention, when the decoder receives a coded bitstream associated with a current block, the decoder determines, from the coded bitstream, a current motion prediction direction for the current block, where the current motion prediction direction is either bi-prediction or uni-prediction. If the prediction is uni-prediction with a first reference list (e.g., reference list L0), the decoder determines a first coded motion information related to a reference picture in the first reference list from the coded bitstream, in which the first coded motion information corresponds to M types of information. The decoder also determines a second coded motion information related to a reference picture in a second reference list (e.g., reference list L1) from the coded bitstream, in which the second coded motion information corresponds to N types of information. In this embodiment, M and N are positive integers but N is smaller than M. For example, the first coded motion information may correspond to 3 types of information and the second coded motion information may correspond to one type of information. The decoder may derive a first motion vector from the first coded motion information according to a corresponding Inter prediction scheme, and derive a second motion vector from the second coded motion information based on another corresponding Inter prediction scheme. Then, the decoder applies a bi-prediction motion compensated decoding to the current block based on the first motion vector and the second motion vector.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention may correspond to one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding for blocks coded in Inter prediction mode, the method comprising:
   receiving a coded bitstream associated with a current block;
   determining, from the coded bitstream, a current motion prediction direction for the current block, wherein the current motion prediction direction is either bi-prediction or uni-prediction;
   if the current motion prediction direction is uni-prediction with a first reference list:
      determining, from the coded bitstream, a Merge candidate according to a Merge index pointing to the Merge candidate in a Merge candidate set;
      deriving, from the coded bitstream, a first motion vector according to coded motion information with respect to a motion vector predictor in a motion-vector-prediction (MVP) candidate set, wherein the first motion vector refers to a first reference picture in the first reference list; and
      applying bi-prediction motion compensated decoding to the current block based on the first motion vector and a second motion vector of the Merge candidate pointing to a second reference list different from the first reference list.

2. The method of claim 1, wherein the coded motion information with respect to the motion vector predictor includes a reference index pointing to the first reference picture, a MVP index pointing to the motion vector predictor in the MVP candidate set, and a motion vector difference (MVD) between the first motion vector and the motion vector predictor.

3. The method of claim 1, wherein if the uni-prediction corresponds to list L0, the second motion vector of the Merge candidate pointing to list L1.

4. The method of claim 1, wherein if the uni-prediction corresponds to list L1, the second motion vector of the Merge candidate pointing to list L0.

5. The method of claim 1, wherein the Merge candidate set is derived according to a Merge candidate set generation process for Merge mode coding.

6. The method of claim 1, wherein the Merge candidate set is derived from an initial Merge candidate set by re-locating a bi-prediction Merge candidate to two uni-prediction candidates or re-locating a uni-prediction Merge candidate to an empty entry of the initial Merge candidate set, wherein the initial Merge candidate set is generated according to a Merge candidate set generation process for Merge mode coding.

7. The method of claim 1, wherein the Merge candidate set is generated by inserting into the Merge candidate set with different Merge candidates from initial Merge candidates for initial Merge candidate set, wherein the initial Merge candidates are inserted into the initial Merge candidate set according to a Merge candidate set generation process for Merge mode coding.

8. The method of claim 1, wherein the Merge candidate set for the second reference list is derived from another Merge candidate set for the first reference list.

9. The method of claim 1, wherein whether to apply the bi-prediction motion compensated decoding to the current block is according to a flag explicitly signaled or implicitly inferred.

10. The method of claim 1, wherein whether to apply the bi-prediction motion compensated decoding to the current block is according to a size of the current block, wherein the current block corresponds to a coding unit (CU) or a prediction unit (PU).

11. A method of video coding for blocks coded in Inter prediction mode, the method comprising:
   receiving input data associated with a current block;
   determining a current motion prediction direction for the current block, wherein the current motion prediction direction is either bi-prediction or uni-prediction;
   if the current motion prediction direction is uni-prediction using a current motion vector referring to a first reference picture in a first reference list:
      generating coded motion information for the current motion vector using a motion vector predictor selected from a motion-vector-prediction (MVP) candidate set;
      determining a Merge candidate from a Merge candidate set; and
      applying bi-prediction motion compensated encoding to the current block based on the current motion vector and a second motion vector corresponding to the Merge candidate pointing to a second reference list different from the first reference list.

12. The method of claim 11, wherein the coded motion information with respect to the motion vector predictor includes a reference index pointing to the first reference picture, a MVP index pointing to the motion vector predictor in the MVP candidate set, and a motion vector difference (MVD) between the current motion vector and the motion vector predictor.

13. The method of claim 11, wherein if the uni-prediction corresponds to list L0, the second motion vector of the Merge candidate pointing to list L1.

14. The method of claim 11, wherein if the uni-prediction corresponds to list L1, the second motion vector of the Merge candidate pointing to list L0.

15. The method of claim 11, wherein the Merge candidate set is derived according to a Merge candidate set generation process for Merge mode coding.

16. The method of claim 11, wherein the Merge candidate set is derived from an initial Merge candidate set by re-locating a bi-prediction Merge candidate to two uni-prediction candidates or re-locating a uni-prediction Merge candidate to an empty entry of the initial Merge candidate set, wherein the initial Merge candidate set is generated according to a Merge candidate set generation process for Merge mode coding.

17. The method of claim 11, wherein the Merge candidate set is generated by inserting into the Merge candidate set with different Merge candidates from initial Merge candidates for initial Merge candidate set, wherein the initial Merge candidates are inserted into the initial Merge candidate set according to a Merge candidate set generation process for Merge mode coding.

18. The method of claim 11, wherein the Merge candidate set for the second reference list is derived from another Merge candidate set for the first reference list.

19. The method of claim 11, wherein whether to apply the bi-prediction motion compensated encoding to the current block is according to a flag explicitly signaled or implicitly inferred.

20. The method of claim 11, wherein whether to apply the bi-prediction motion compensated encoding to the current block is according to a size of the current block, wherein the current block corresponds to a coding unit (CU) or a prediction unit (PU).

\* \* \* \* \*